United States Patent [19]

Nagae

[11] 4,030,902

[45] June 21, 1977

[54] FLOAT GLASS BAND WIDTH CONTROL METHOD

[75] Inventor: Yasuyuki Nagae, Sakai, Japan

[73] Assignee: Central Glass Co., Ltd., Ube, Japan

[22] Filed: Apr. 1, 1976

[21] Appl. No.: 672,560

Related U.S. Application Data

[63] Continuation of Ser. No. 523,545, Nov. 13, 1974, abandoned.

[30] Foreign Application Priority Data

Nov. 14, 1974 Japan .............................. 49-127187

[52] U.S. Cl. ................................... 65/29; 65/65 A; 65/99 A; 65/160; 65/182 R
[51] Int. Cl.² ........................................ C03B 18/02
[58] Field of Search ...... 65/29, 65 A, 99 A, 182 R, 65/158, 164, DIG. 13, 160; 356/159, 160

[56] References Cited

UNITED STATES PATENTS

| | | | |
|---|---|---|---|
| 2,674,917 | 4/1954 | Summerhayes, Jr. | ............. 356/160 |
| 3,764,285 | 10/1973 | Matesa et al. | ............. 65/182 R X |

*Primary Examiner*—Arthur D. Kellogg

[57] ABSTRACT

A method for maintaining constant the width of a glass band manufactured by a float method. A pair of position detectors are positioned within the melted metal bath chamber to produce position signals representing positions of both edges of glass band floating on the melted metal. The position signals are converted into a band width signal which is used for regulating the height or opening of the tweel.

4 Claims, 5 Drawing Figures

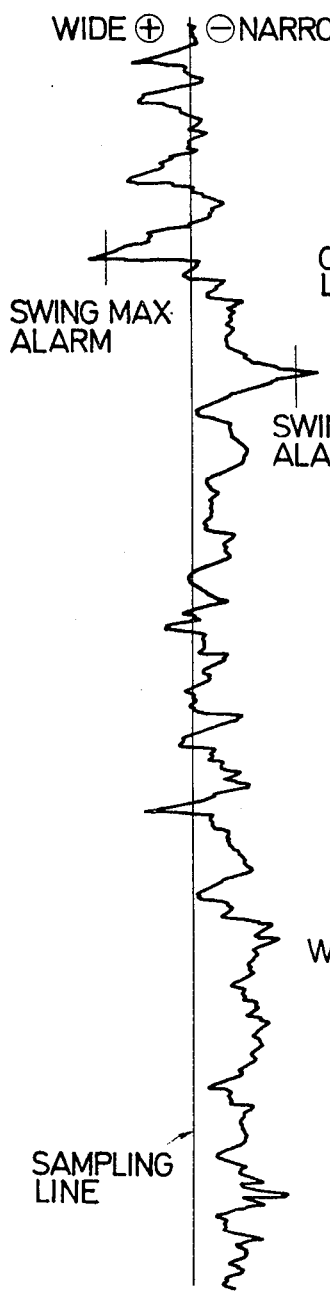
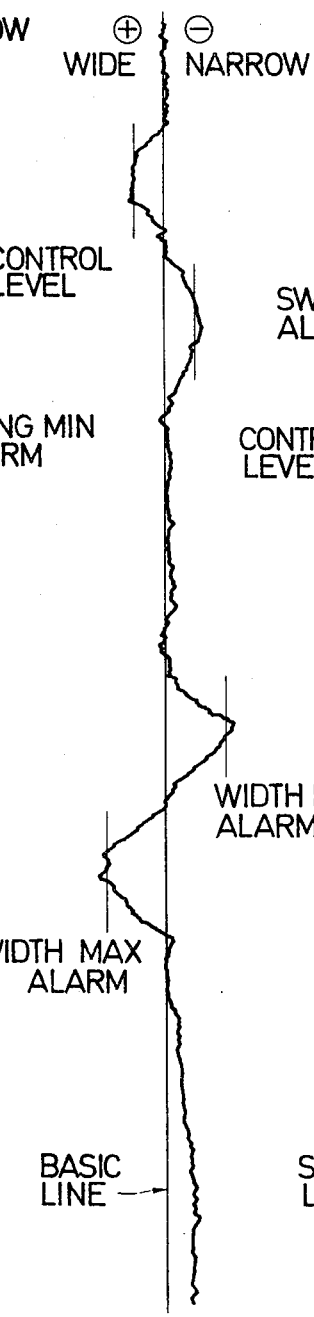
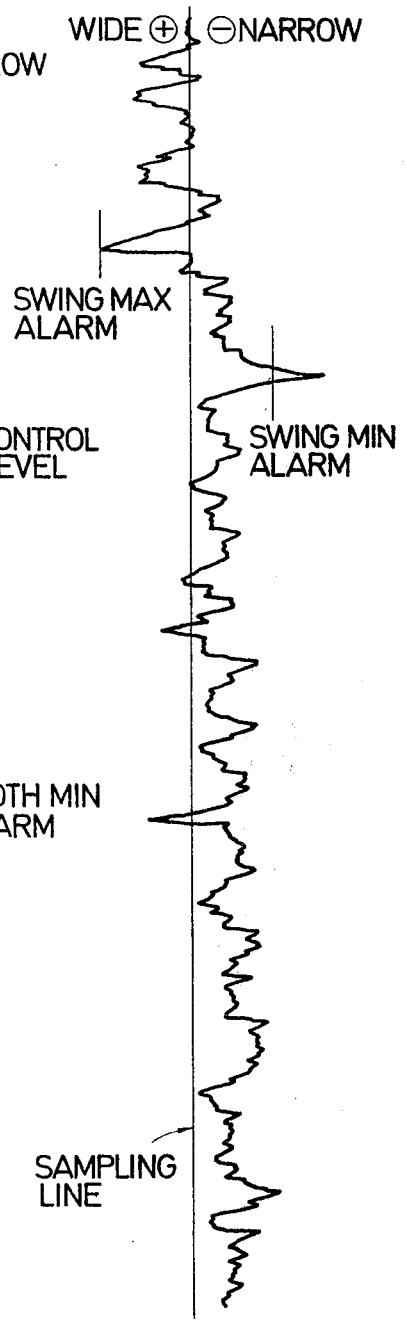

FLOAT GLASS BAND WIDTH CONTROL METHOD

This is a continuation of application Ser. No. 523,545, filed Nov. 13, 1974, now abandoned.

The present invention relates in general to a so-called float method for the manufacture of glass band or plate and in particular to a glass band width control method for maintaining constant the width of glass band manufactured by a float method.

As is well known in the art, the float method for the glass plate manufacture is performed by charging melted glass into a melted metal bath chamber and advancing the melted glass in a direction in the form of a glass band on the melted metal bath. The flow rate of the melted glass is regulated by changing the height or opening of a tweel provided in the inlet port of the melted metal bath chamber.

Various methods for regulating the height of the tweel have been developed, one of which includes injecting a gas onto side edges of the glass plate, detecting the positions of side edges of the glass band by sensing the back pressure of the injected gas, and then regulating the height of the tweel. Another method is performed by providing an image pick-up tube in the chamber and observing the image reproduced by a display tube so as to regulate the height of the tweel.

However, difficulty has been encountered in the former method in that since the melted metal bath chamber is filled with an inert gas so as to prevent unwanted oxidation of the melted metal, the injected gas is subjected to convection flow of the heated inert gas in the melted metal bath thereby to cause erroneous detection of the back pressure of the injected gas. Further, the high pressure of the inert gas make difficult correct detection of the back pressure of the injected gas. Furthermore, the injected gas adversely affect the heat balance established in the chamber.

On the other hand the latter method cannot provide desiredly precise control of the tweel and further causes serious fatigue of the observer.

Accordingly, it is a primary object of the present invention to provide a new and improved glass band width regulating method which can be performed without influence from the convention flow of the inert gas in the melted metal bath chamber.

It is another object to provide a new and improved glass band width regulating method which does not affect the heat balance established in the melted metal bath chamber.

It is a further object to provide a new and improved glass band width regulating method which can be performed under desiredly high preciseness.

In the drawings:

FIGS. 3A, 3B and 3C are waveforms of signals appearing in the system of FIG. 1.

Figure 1:
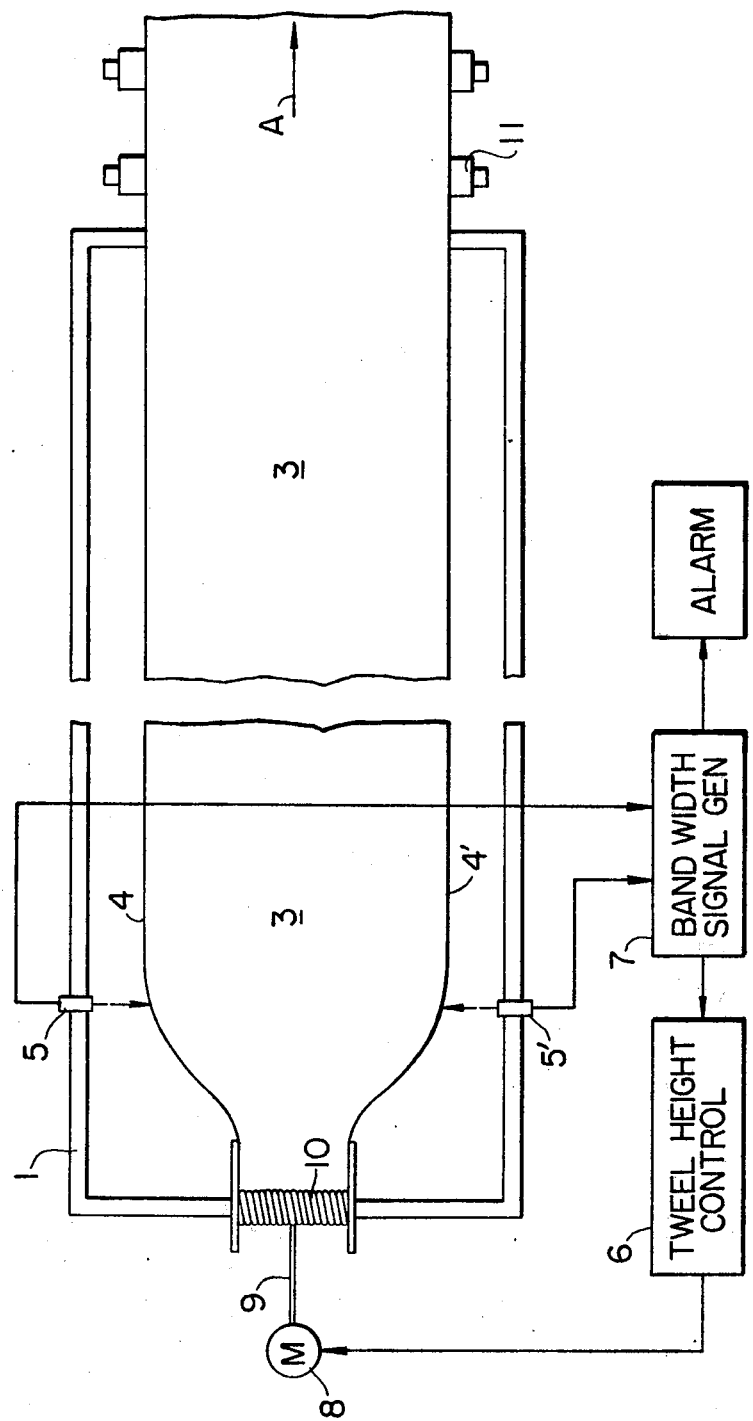
FIG. 1 is a block diagram showing a system for performing to the present invention.
Figure 2:
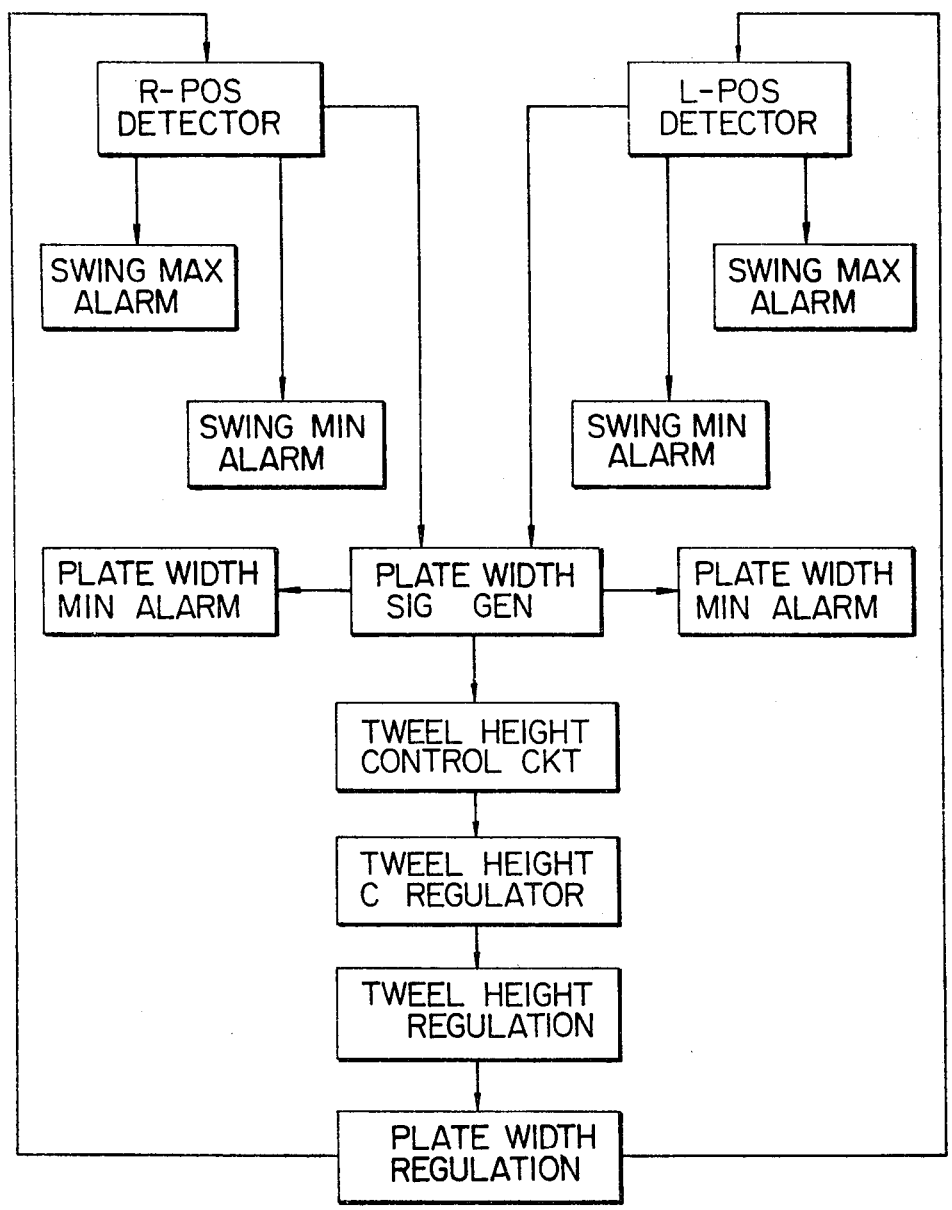
FIG. 2 is a flow chart explaining the function of the system of FIG. 1.

Referring now to FIG. 1, there is shown a furnace 1 forming therein a melted metal bath chamber 2. Melted glass is charged through an inlet into the chamber 2 so as to form a glass band 3 on the surface of the melted metal bath contained in the chamber 2. The glass band 3 is advanced in such a direction as indicated by an arrow A. In order to detect the positions of both side edges 4 and 4' of the glass band 3, there are positioned two photo-electric position detectors 5 and 5' such as video-analyzers in the side walls of the furnace 1. The position detectors 5 and 5' respectively scan around the edge portions of the glass band 3 in a direction generally perpendicular to the advancing direction of the glass band and produce position signals respectively representing the positions of the side edge edges of the glass band 3. The video-analyzer may include an image pickup tube for scanning the glass band 3 in the direction generally perpendicular to the advancing direction and repeatedly producing image signals each representing an image lying on a line perpendicular to the advancing direction and a processor for converting the image signals into the position signal. The position signal from the detectors 5 and 5' are applied to the glass band or plate width signal generator 7 which then produces a band width signal. The band width signal is applied to a tweel height control circuit 6 which controls a tweel actuator motor 8 in accordance with the width signal. A rotary transmission shaft 9 connected to the actuator motor 8 is in turn connected via a height adjust mechanism (not shown) to a tweel 10 provided in the inlet of the chamber 2. Thus, the height of the tweel 10 is changed to regulate the opening of the inlet in accordance with the directed width of the glass band 3 so as to maintain the width of the glass band 3 substantially constant. The glass band 3 formed in the chamber is conveyed onto guide rollers 11 arranged adjacent an outlet of the furnace 1.

The operation of the system of FIG. 1 is explained hereinbelow in connection with FIGS. 2, 3A, 3B and 3C.

The position detector 5 and 5' produce position signals respectively having such waveforms as shown in FIGS. 3A and 3C. The position signals are applied to the band width signal generator 7 which produces the band width signal having such a wave form as shown in FIG. 3B in accordance with the position signals. The width signal is applied to the tweel height control circuit 6 which actuates the motor 8 when the amplitude of the width signal exceeds a preselected control level. The direction of rotation of the motor 8 corresponds to the polarity of the width signal. Thus, when the width of the produced glass band or plate 3 becomes too narrow the tweel is raised so as to increase the flow rate of the melted glass. When, on the contrary, the width of glass band 3 becomes too wide the tweel is lowered to reduce the flow rate of the melted glass. It is to be understood that an actuation signal from the control circuit 6 accords with the deviation of the preselected control level from the central level corresponding to the desired band width in order to suppress hunting phenomenan.

It is now to be noted that the glass band 3 is subject to so-called 'swing' motion. Thus, the band width signal generator 7 is provided with a function to alarm when the amplitude of either one of the position signal exceeds a preselected swing maximum or minimum level. Further, the band width signal generator 7 functions to alarm when the amplitude of the band width signal exceeds a preselected lever for the purpose of fail safe of the system. Those alarming functions of the band width signal generator 7 are preferred to prevent erroneous operation of the system in view of the limited scanning area of the position detectors 5 and 5'.

It is now apparent from the above-description that the method according to the invention is not affected by the convection flow of the inert gas in the melted metal bath chamber and does not disturb the heat balance established in the bath chamber, thereby desirably performing correct control for maintaining the glass band constant. Accordingly, a system utilizing this method can economically perform massproduction of glass plate with uniform quality.

What is claimed is:

1. A method for controlling the width of a glass band manufactured through a float method wherein melted glass is charged into a melted metal bath chamber by way of an inlet of the chamber provided with a tweel, which is characterized by:

detecting visible rays emitted from both side edges of a portion of said glass band in said chamber so as to produce only two continuous electric position signals respectively representing positions of both side edges of a portion of said glass band in said chamber, the visible rays being detected as images by a single pair of image pick-up tubes which are respectively diametrically disposed on the both side walls of the chamber above the metal bath;

said image pick-up tubes being aimed in a direction to receive an image of the respective side edges;

converting said two continuous electric position signals into a width signal representing the width of said glass band; and continuously regulating the position of said tweel in accordance with said width signal so as to maintain substantially constant the width of said glass band.

2. A method as defined in claim 1, in which the detecting step includes:

repeatedly producing first signals each representing a visible image lying around one edge portion of said glass band and along a line generally perpendicular to the advancing direction of said glass band:

repeatedly producing second signals each representing a visible image lying around the other edge portion of said glass band and along a line generally perpendicular to the advancing direction of said glass band: and converting said first and second signals into said position signals.

3. A method as defined in claim 1, which is further characterized by:

alarming when the amplitude of first and/or second signals exceeds a preselected level.

4. A method as defined in claim 1, which is further characterized by:

alarming when the amplitude of said width signal exceeds a preselected level.

* * * * *